US009126513B2

(12) United States Patent
Jeong

(10) Patent No.: US 9,126,513 B2
(45) Date of Patent: Sep. 8, 2015

(54) HEADREST MOVING DEVICE

(71) Applicant: Woobo Tech Co., Ltd., Pyeongtaek-si (KR)

(72) Inventor: Hae IL Jeong, Incheon (KR)

(73) Assignee: Woobo Tech Co., Ltd., Seoul (KR)

( * ) Notice: Subject to any disclaimer, the term of this patent is extended or adjusted under 35 U.S.C. 154(b) by 0 days.

(21) Appl. No.: 14/234,976

(22) PCT Filed: Mar. 6, 2013

(86) PCT No.: PCT/KR2013/001816
§ 371 (c)(1),
(2) Date: Jan. 24, 2014

(87) PCT Pub. No.: WO2013/154269
PCT Pub. Date: Oct. 17, 2013

(65) Prior Publication Data
US 2014/0182404 A1    Jul. 3, 2014

(30) Foreign Application Priority Data

Apr. 10, 2012  (KR) .......................... 10-2012-0037169

(51) Int. Cl.
*A47C 7/38*         (2006.01)
*B60N 2/48*         (2006.01)

(52) U.S. Cl.
CPC ............ *B60N 2/4814* (2013.01); *B60N 2/4817* (2013.01); *B60N 2/4864* (2013.01); *Y10T 74/18576* (2015.01)

(58) Field of Classification Search
CPC ............... B60N 2/4811; B60N 2/4829; B60N 2002/4894
USPC .................................................. 297/409, 410
See application file for complete search history.

(56) References Cited

U.S. PATENT DOCUMENTS 5,433,508 A * 7/1995 Akima et al. ................. 297/410
6,364,415 B1 * 4/2002 Mori et al. .................... 297/410
(Continued)

FOREIGN PATENT DOCUMENTS

JP    1990-013433    1/1990    ............... A47C 7/38
JP    2000-052825    2/2000    ............... B60N 2/16
(Continued)

OTHER PUBLICATIONS

The State Intellectual Property Office of the People's Republic of China, Notification of the First Office Action—Application No. 201380002493.6, issued on May 26, 2015, 7 pages.
(Continued)

*Primary Examiner* — Rodney B White
(74) *Attorney, Agent, or Firm* — Sunstein Kann Murphy & Timbers LLP

(57) ABSTRACT

A headrest moving device which includes a press member, a moving unit that is moved horizontally by the press member, a return spring that functions to return the moving unit to an original position, a screw, a block that is provided with threads in the inner circumferential surface thereof and is engaged with the screw through a screw type engagement, a locking unit that selectively releases the block from a locked state in response to a movement of the moving unit, and a frame that is installed on a stay rod and supports the moving unit, in which either one of the screw and the block can be rotated so that the device can control the position of a headrest steplessly in forward and backward directions.

6 Claims, 11 Drawing Sheets

(56) References Cited

U.S. PATENT DOCUMENTS

| | | | |
|---|---|---|---|
| 6,543,852 B2 * | 4/2003 | Mori | 297/410 |
| 7,690,729 B2 | 4/2010 | Liao | 297/408 |
| 8,573,702 B2 * | 11/2013 | Tscherbner et al. | 297/410 |
| 2006/0001308 A1 * | 1/2006 | Humer et al. | 297/410 |
| 2009/0224590 A1 * | 9/2009 | Becker et al. | 297/410 |
| 2010/0327645 A1 | 12/2010 | Jeong | 297/408 |
| 2011/0089737 A1 | 4/2011 | Tscherbner et al. | 297/391 |
| 2011/0204686 A1 | 8/2011 | Lee et al. | 297/216.12 |
| 2012/0126605 A1 | 5/2012 | Gross et al. | 297/410 |
| 2013/0049430 A1 * | 2/2013 | Sobieski et al. | 297/410 |

FOREIGN PATENT DOCUMENTS

| | | | |
|---|---|---|---|
| JP | 2001-061592 | 3/2001 | A47C 7/38 |
| KR | 10-2009-0065725 A | 6/2009 | B60N 2/48 |
| WO | WO 2010/112227 | 10/2010 | B60N 2/48 |

OTHER PUBLICATIONS

The State Intellectual Property Office of the People's Republic of China, *English Translation*—Notification of the First Office Action, Application No. 201380002493.6, issued on May 26, 2015, 9 pages.

* cited by examiner

HEADREST MOVING DEVICE

TECHNICAL FIELD

The present invention relates, in general, to headrest moving devices for vehicles, and, more particularly, to a headrest moving device that includes a press member, a moving unit horizontally moved by the press member, a return spring for returning the moving unit, a screw, a block provided with threads in an inner circumferential surface thereof and engaged with the screw through a screw type engagement, a locking unit selectively releasing the block from a locked state in response to a movement of the moving unit, and a frame installed on a stay rod and supporting the moving unit, in which either one of the screw and the block can be rotated.

BACKGROUND ART

As shown in FIG. 1, a conventional headrest moving device that is used to move a headrest of a vehicle back and forth comprises: a cylindrical rod-shaped moving body 20, with a coil spring 30 wound around the outer circumferential surface of the moving body 20; a first tubular support member 50 in which the first end of the moving body 20 along with the coil spring 30 passes through so as to slide therethrough and which is provided in the sidewall thereof with an insert slit 51 that holds the distal arm of the first end of the coil spring 30 therein, and which surrounds and holds the first end of the coil spring 30 an actuating member 40 that surrounds the second end of the coil spring 30 and is provided with a spacing part 42 in which the distal arm of the second end of the coil spring 30 is inserted so as to be guided by the spacing part 42, with a handle 41 extending from the outer circumferential surface of the actuating member in a radial direction; a second tubular support member 60 that supports the second end of the coil spring 30 in the actuating member 40; and a tubular locking member 10 that surrounds both the actuating member 40 and the first and second support members 50 and 60 so as to hold them, with an axial locking slit 11 formed in the sidewall of the locking member 10 so as to receive the handle 41 of the actuating member 40 therein in such a way that the handle 41 can be rotated in the slit 11.

The actuating member 40 is formed by bending a plate material so that the member 40 can form a tubular body, in which the first end of the plate material forms the spacing part 42 and the second end vertically extends so as to form the handle 41.

The first end of the second support member 60 is configured to form a two-stepped end, the inside end of which abuts on the second end of the actuating member 40.

When assembling the parts into the above-mentioned device for moving the headrest back and forth, the actuating member 40 is combined with the locking member 10 in such a way that the handle 41 of the actuating member 40 is exposed downward to the outside of the locking member 10 through the axial locking slit 11 of the locking member 10. Further, the first end of the coil spring 30 is surrounded and held by the first support member 50, and the second end of the spring 30 is inserted into the actuating member 40, thereby being held in the actuating member 40.

In the above state, the coil spring 30 holds the moving body 20 in a combination of surface contact and point contact, so that the moving body 20 cannot move.

However, when the handle 41 of the actuating member 40 is rotated so as to increase the diameter of the coil spring 30 that holds the moving body 20, the interval between neighboring turns of the coil spring 30 is increased and releases the moving body 20, so that the moving body 20 can slide back and forth in the hollow openings of the first and second support members 50 and 60 without intervening with the coil spring.

However, the conventional device for moving the headrest back and forth is problematic in that, because the headrest is moved back and forth only in response to a movement of the handle, the device is inconvenient to a user.

Further, although a technique in which the handle can be actuated by a wire-operated mechanism instead of a hand-operated mechanism was developed and proposed, the wire-operated mechanism is problematic in that a difference undesirably occurs between operations and the construction becomes complicated, and the production cost increases.

DISCLOSURE OF INVENTION

Technical Problem

Accordingly, the present invention has been made keeping in mind the above problems occurring in the related art, and is intended to provide a headrest moving device which can realize compactness of the device due to a simple construction, and can easily and efficiently control the forward, backward, upward and downward movement of the headrest using one press member.

Solution to Problem

In order to accomplish the above-mentioned object, in an aspect, the present invention provides a headrest moving device, including: a press member; a moving unit moved horizontally by the press member; a return spring for returning the moving unit; a screw; a block having threads in an inner circumferential surface thereof so that the block can be engaged with the screw through a screw type engagement; a locking unit for releasing the block from a locked state in response to a movement of the moving unit; and a frame installed on a stay rod and supporting the moving unit, wherein either one of the screw and the block is rotated.

In the above-mentioned construction, teeth may be formed around an outer circumferential surface of the block, a block seat may be formed in the locking unit so as to seat the block therein, teeth may be formed in the locking unit in such a way that the teeth of the locking unit are arranged in the block seat, a main protrusion having both a flat surface and an inclined surface may be formed in the moving unit, and an insert opening may be formed in the locking unit so as to receive the main protrusion therein so that, when the moving unit moves horizontally, the locking unit can move upward or downward, wherein the stay rod may be provided with at least two hook slits that are formed vertically such that the moving unit can be caught by the hook slits.

In order to accomplish the above-mentioned object, in another aspect, the present invention provides a headrest moving device, including: a press member; a moving unit moved horizontally by the press member; a return spring for returning the moving unit; a screw; a block having a through hole through which the screw passes; a locking unit for releasing the block from a locked state in response to a movement of the moving unit; and a frame installed on a stay rod and supporting the moving unit, wherein either one of the screw and the block is rotated, and a ball is placed between the screw and the block.

The press member may include a first press member and a second press member, the moving unit may include a first moving unit that is moved by the first press member and a second moving unit that is moved by the second press member, the stay rod may be provided with at least two hook slits that are formed vertically such that the first moving unit can be caught by the hook slits, and the locking unit may release the block from the locked state in response to a movement of the second moving unit.

Advantageous Effects of Invention

As above-mentioned headrest moving device of the present invention provides the following advantages.

The headrest moving device of the present invention is advantageous in that it includes a press member, a moving unit horizontally moved by the press member, a return spring for returning the moving unit, a screw, a block provided with threads in the inner circumferential surface thereof and engaged with the screw through a screw type engagement, a locking unit selectively releasing the block from a locked state in response to a movement of the moving unit, and a frame installed on a stay rod and supporting the moving unit, in which either one of the screw and the block can be rotated so that the device can control the position of a headrest steplessly in forward and backward directions.

Further, the headrest moving device of the present invention is advantageous in that it uses the press member instead of a wire-operated mechanism, thereby preventing an occurrence of a difference between operations and simplifying the construction, and preventing the production cost from increasing.

Further, in the headrest moving device of the present invention, the outer circumferential surface of the block is provided with teeth, the locking unit is provided with a block seat for seating the block therein, with teeth formed in the block seat of the locking unit, the moving unit is provided with a main protrusion having both a flat surface and an inclined surface, and the locking unit is provided with an insert opening for receiving the main protrusion therein so that when the moving unit moves horizontally, the locking unit can move upward or downward, and so the present invention can realize a simple construction and can efficiently lock or release the block.

The headrest moving device further includes a forward/backward guide part that can guide the forward/backward movement of the screw, wherein the forward/backward guide part is provided with a guide rod for guiding the movement of the screw, and an elastic member is placed in the front or in the back of the guide rod, so that a dimensional error that may be generated during a process of producing both the guide rod and the screw can be efficiently absorbed by the elastic member during a process of assembling them.

Further, at least two hooking slits are formed vertically in the stay rod so as to catch the moving unit, so that the present invention can efficiently control the forward, backward, upward and downward position of the headrest by a single motion in which the press member is pressed one time.

Further, the present invention is advantageous in that balls are placed between the screw and the block and so a relative rotation between the screw and the block can be efficiently performed, thereby realizing improved operational performance of the headrest moving device.

Further, in the headrest moving device of the present invention, the press member-comprises a first press member and a second press member, the moving unit comprises a first moving unit moved by the first press member and a second moving unit moved by the second press member, the stay rod is provided with at least two hooking slits that are formed vertically and catch the first moving unit, and the locking unit releases the block from a locked state in response to a movement of the second moving unit, and so the present invention can separately control the forward, backward, upward and downward positions of the headrest using the two press members and this prevents an undesired positional adjustment of the headrest which is not intended by a user.

MODE FOR THE INVENTION

Figure 1:
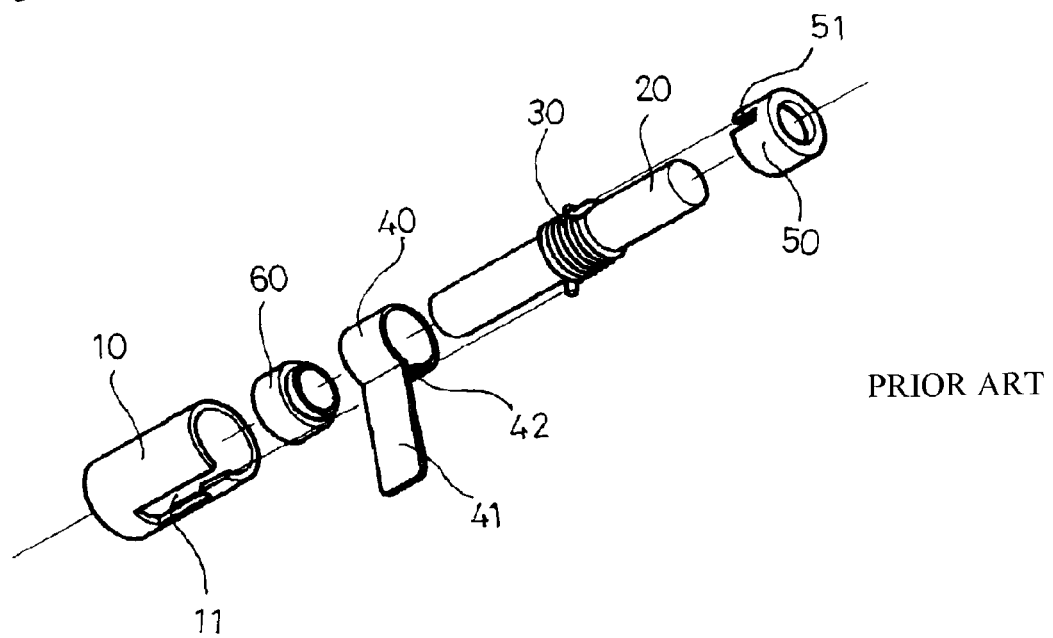
FIG. 1 is an exploded perspective view illustrating a conventional device for moving a headrest back and forth.

Hereinbelow, preferred embodiments of the present invention will be described in detail with reference to the accompanying drawings.

In the following description, it is to be noted that the same elements of the present invention as those of the related art techniques will be referred to the description of the related art, and a detailed description of those elements will be omitted.

As shown in FIGS. 2 through 18, a headrest moving device according to a preferred embodiment of the present invention includes a press member 220, a moving unit 200 that is moved horizontally by the press member 220, a return spring 300 that returns the moving unit 200 to an original position, a screw 700, a block 600 that has threads in the inner circumferential surface thereof so that the screw 700 can be engaged with the block 600 through a screw type engagement, a locking unit 500 that releases the block 600 from a locked state in response to a movement of the moving unit 200, and a frame 210 that is installed on a stay rod 400 and supports the moving unit 200, wherein either one of the screw 700 and the block 600 can be rotated.

Figure 2:
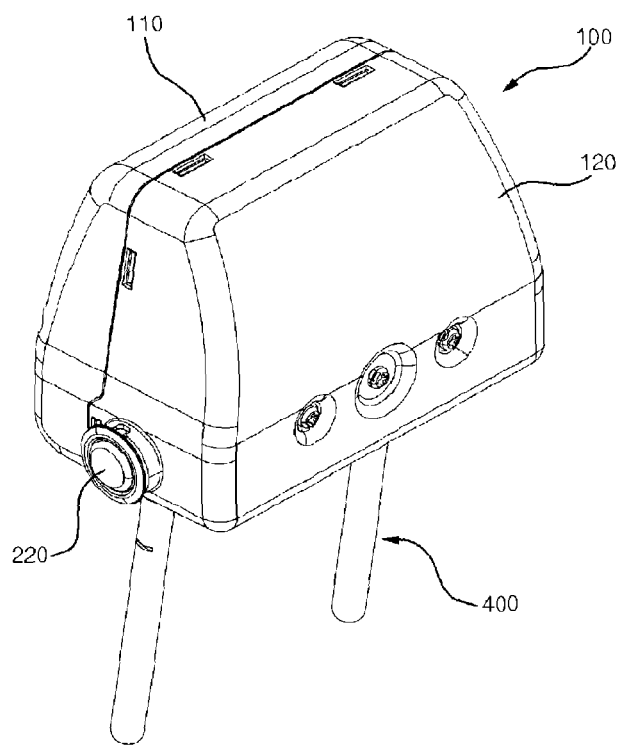
FIG. 2 is a perspective view illustrating a headrest moving device according to a preferred embodiment of the present invention

As shown in FIG. 2, the headrest moving device of the present invention includes a cover 100 that covers the device.

The cover 100 comprises a front cover 110 that is placed in the front of the device, and a rear cover 120 that is placed in the back of the device and is combined with the front cover 110.

Figure 3:
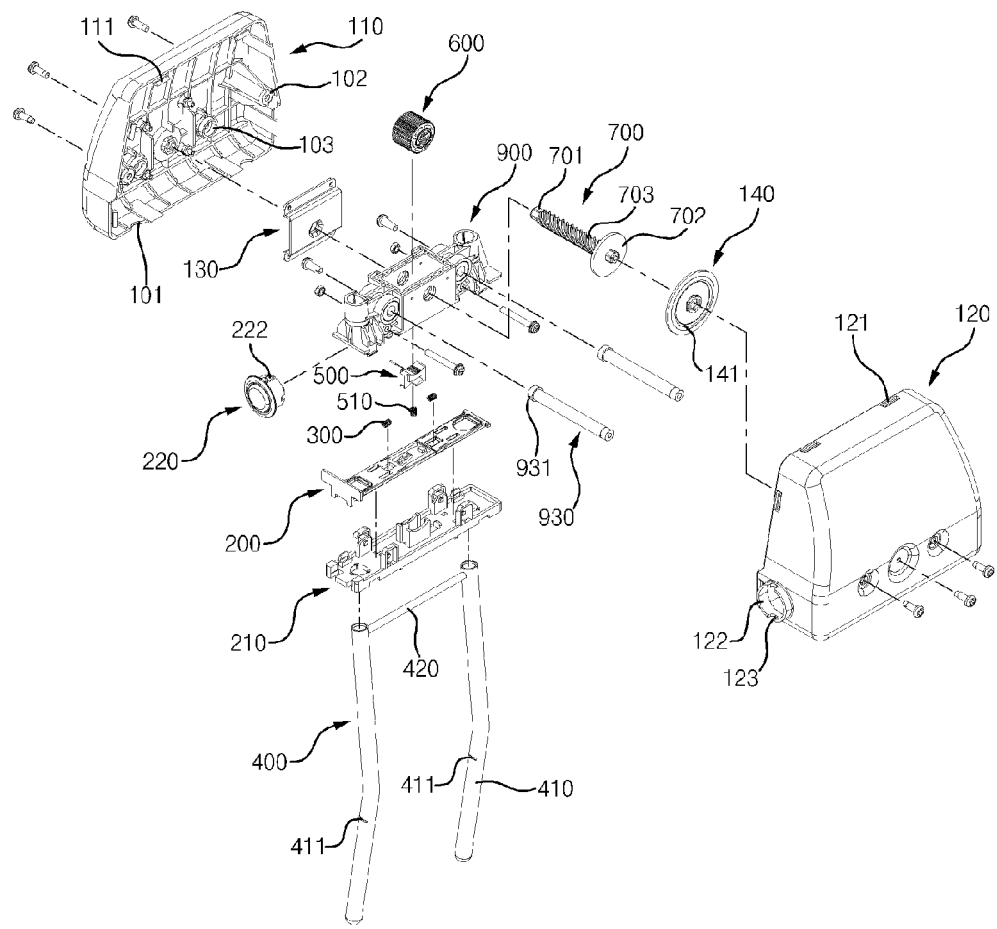
FIG. 3 is an exploded perspective view illustrating the headrest moving device of FIG. 2.

As shown in FIG. 3, the front cover 110 is provided with locking hooks 111 that are formed along the upper, lower and opposite side edges of the front cover 110, and the rear cover 120 is provided with locking slots 121 into which the locking hooks 111 are inserted so as to be locked thereto. Due to the locking hooks 111 and the locking slots 121, the front cover 110 and the rear cover 120 can be preliminarily assembled and this realizes easy assembly of the parts.

The front cover 110 and the rear cover 120 are provided with locking holes 102 that are used to fasten the front and rear covers 110 and 120 together using bolts. Here, the locking holes 102 also allow desired parts to be installed in the cover 100 by the bolts.

The locking holes 102 includes locking holes 102 to which respective guide rods 930 are locked as will be described later herein. Here, the locking holes 102 functioning to lock the guide rods 930 are provided with respective seats 103 that surround the respective locking holes 102.

Further, a stay rod passing hole 101 is formed in a lower portion of the cover 100.

Further, a press member guide 122 is formed in a lower portion of each sidewall of the rear cover 120.

The press member guide 122 has a cylindrical shape, with a horizontal movement guide slit 123 formed in an upper portion of the cylindrical press member guide 122.

The press member 220 is installed in the press member guides 122 of the rear cover 120 in such a way that the press member 220 can move horizontally to the left and right.

The press member 220 comprises a press button, with a guide protrusion formed on the outer circumferential surface of the press member 220 such that the guide protrusion of the press member 220 can be inserted into the horizontal movement guide slit 123.

Further, hooks 222 protrude from the opposite ends of the outer circumferential surface of the press member 220 so that the press member 220 can be installed in the cover 100 by fitting the press member 220 into the rear cover 120 one time.

Figure 14:
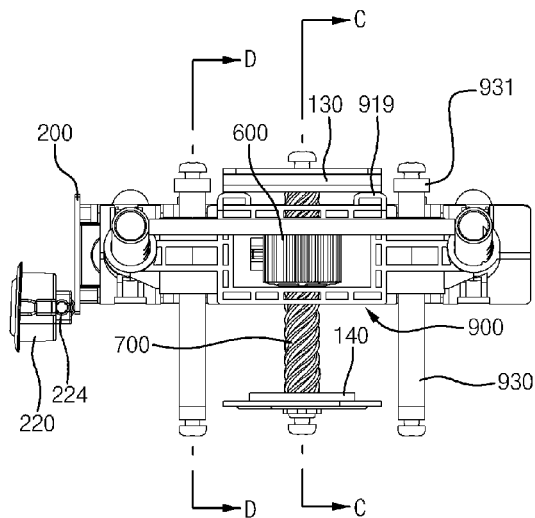
FIG. 14 is a plan view illustrating the assembly of the headrest moving device according to the preferred embodiment of the present invention from which the cover is removed.

Further, as shown in FIG. 14, in an end of the press member 220, a pressing force transfer member 224 is rotatably installed in such a way that the axle of the pressing force transfer member 224 is perpendicular to the pressing direction of the press member 220.

The pressing force transfer member 224 is configured as a roller-shaped member.

Due to the pressing force transfer member 224, even when a user fails to press the center of the press member 220, the pressing force of the user can be efficiently-transferred and the frictional noise generated between the press member 220 and the moving unit 200 can be efficiently reduced as will be described hereinbelow.

The moving unit 200 moves horizontally by the pressing force of the user which is applied to the press member 220.

Figure 4:
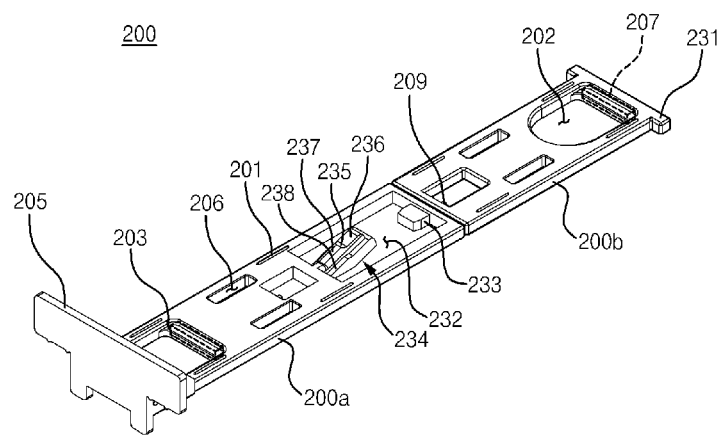
FIG. 4 is a perspective view illustrating a moving unit of the headrest moving device according to the preferred embodiment of the present invention.

As shown in FIG. 4, the moving unit 200 is a plate-shaped unit, with a bent contact part 205 formed in an end of the moving unit 200 so that the contact part 205 comes into contact with the pressing force transfer member 224 of the press member 220.

Further, a guide protrusion is formed in a lower portion of the contact part 205.

The moving unit 200 has a main protrusion 234 that is provided with both a flat surface 235 and an inclined surface 237.

The main protrusion 234 is located in the moving unit 200 in such a way that the main protrusion 234 is placed in a first end of a through opening 232 that is formed through the center of the moving unit 200.

Here, the flat surface 235 is formed on the upper surface of the main protrusion 234 and the inclined surface 237 is formed in the main protrusion 234 so as to be placed behind the lower end of the flat surface 235.

The lower surface of the main protrusion 234 is provided with another inclined surface.

Further, a second inclined surface 236 is formed so as to be placed behind the upper end of the flat surface 235 of the main protrusion 234.

Further, a sliding part 238 is formed around the edge of the main protrusion 234 by being stepped, in which the upper surface of the sliding part 238 is configured to correspond to the upper surface of the main protrusion 234.

A sub-protrusion 233 is formed in a second end of the through opening 232.

The upper surface of the sub-protrusion 233 is configured as a flat surface.

Here, the moving unit 200 may be divided into two plates 200a and 200b. The two plates 200a and 200b of the moving unit 200 are placed to be axially aligned with each other in opposite ends of the moving unit 200. Here, when dividing the moving unit 200 into the two plates 200a and 200b, the moving unit 200 is divided in such a way that the main protrusion 234 is formed in one plate 200a of the two plates 200a and 200b.

The moving unit 200 is provided with contact protrusions 201 in upper and lower sections thereof.

The contact protrusions 201 are configured as semicircular (or arc-shaped) protrusions so that the contact protrusions 201 can come into linear contact with other elements and can minimize both the contact friction and the frictional noise.

Stay rod through holes 202 are formed in opposite ends of the moving unit 200, with locking parts 203 formed in the respective stay rod through holes 202 in such a way that the locking parts 203 are placed in predetermined ends of the through holes 202.

Here, the locking parts 203 are configured to be thinner than the other parts of the moving unit 200.

Further, steel plates 207 are formed in the moving unit 200 by an insert molding process in such a way that the steel plates 207 are placed in the respective locking parts 203. Accordingly, the steel plates 207 are prevented from being exposed to the outside.

The steel plates 207 are configured as strap-shaped plates.

Further, spring support plates 209 are formed in opposite ends of the moving unit 200 in such a way that the spring support plates 209 protrude downward.

Here, the spring support plates 209 are formed by cutting parts of the moving unit 200 and by bending the cut parts downward.

The spring support plates 209 are provided with respective anti-removal protrusions that are placed in the center of the return spring 300 so as to prevent the return spring 300 from being suddenly removed from a designated location.

Holes 206 are formed in the opposite ends of the moving unit 200.

As shown in FIG. 3, the return spring 300 comprises two springs so that the two return springs elastically return the two plates of the moving unit 200 to their original positions.

Figure 10:
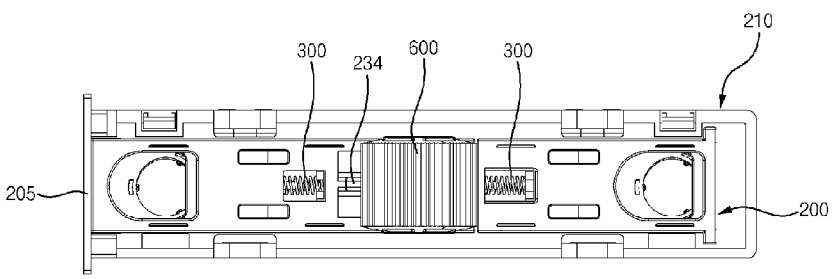
FIG. 10 is a plan view illustrating the assembly including the block according to the preferred embodiment of the present invention.
Figure 11:
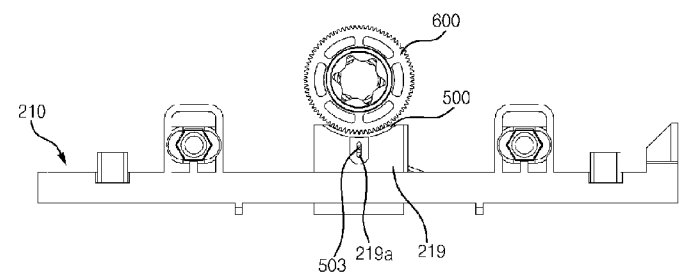
FIG. 11 is a front view illustrating the assembly including the block according to the preferred embodiment of the present invention.
Figure 12:
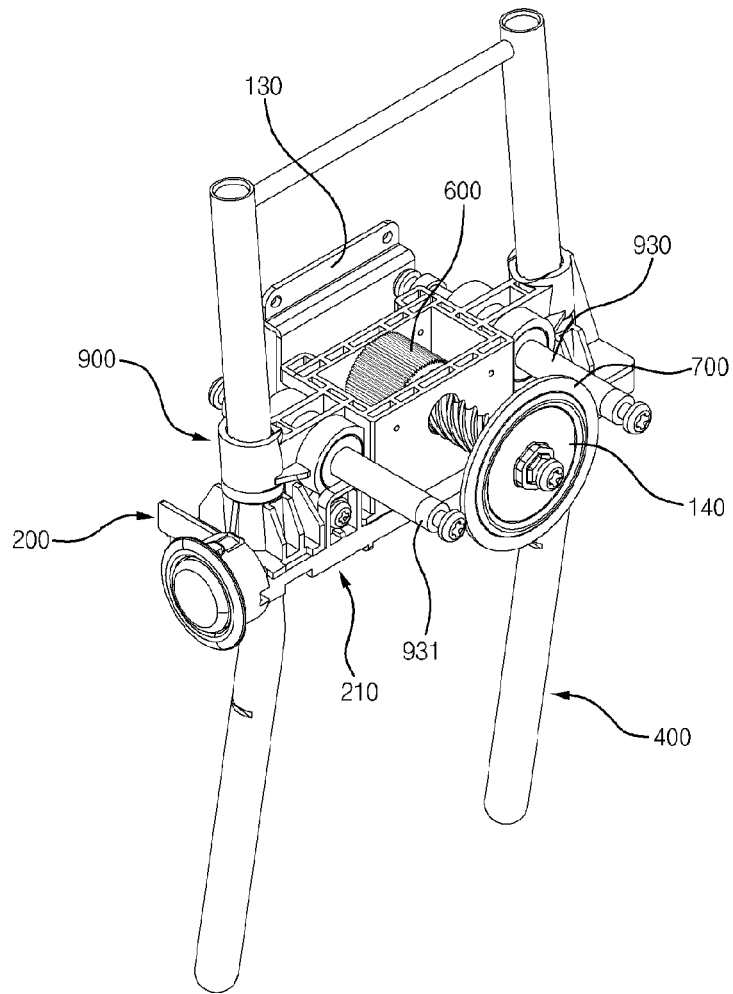
FIG. 12 is a perspective view illustrating the assembly of the headrest moving device according to the preferred embodiment of the present invention from which a cover is removed.
Figure 13:
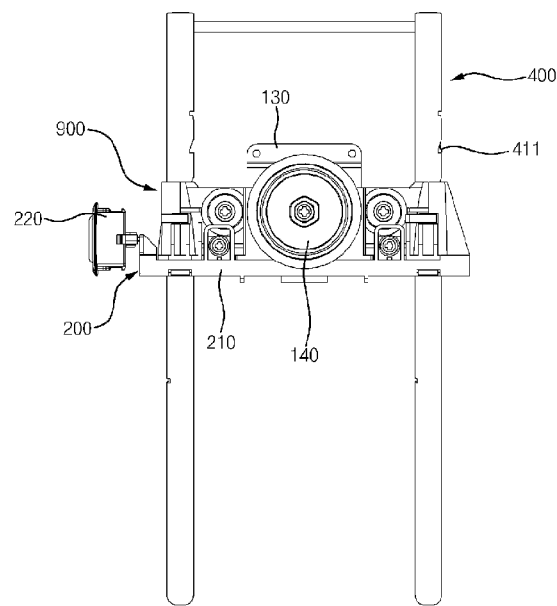
FIG. 13 is a bottom plan view illustrating the assembly of the headrest moving device according to the preferred embodiment of the present invention from which the cover is removed.
Figure 15:
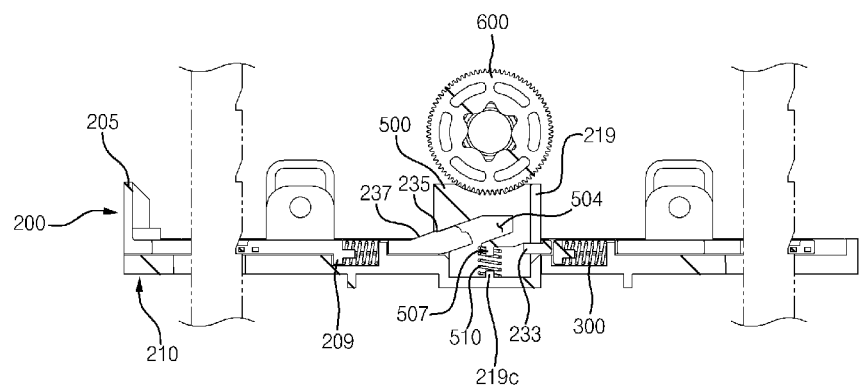
FIG. 15 is a sectional view illustrating the preferred embodiment of the present invention taken along line B-B of FIG. 9.
Figure 16:
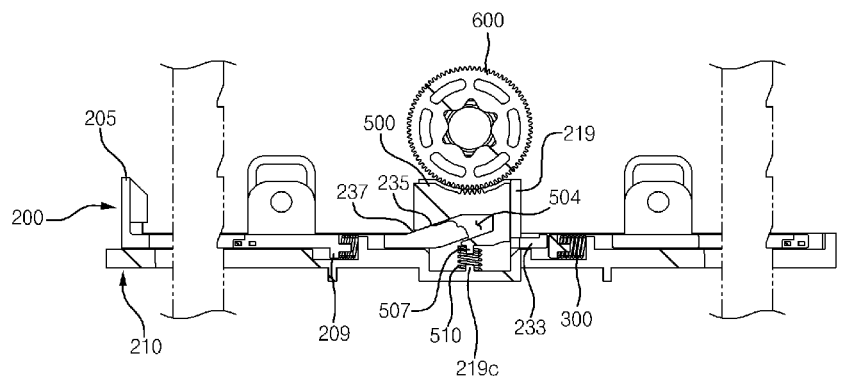
FIG. 16 is a sectional view illustrating of the headrest moving device according to the preferred embodiment of the present invention in which the position of a headrest is movable
Figure 17:
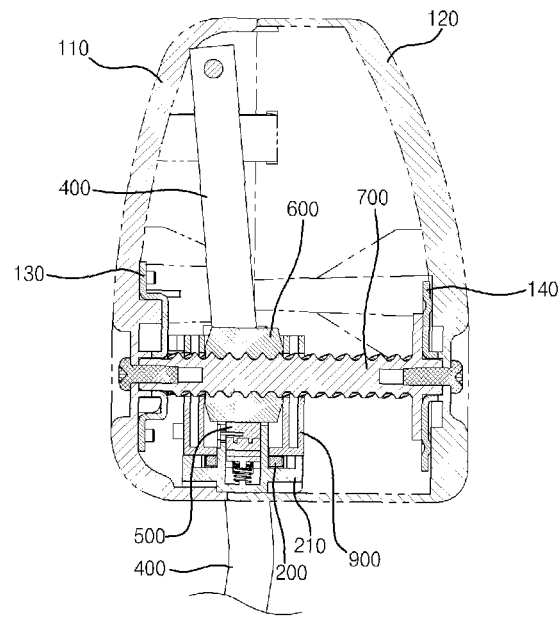
FIG. 17 is a sectional view illustrating the preferred embodiment of the present invention taken along line C-C of FIG. 14.

As shown in FIGS. 10, 15 and 16, the return springs 300 are inserted into the moving unit 200 through cutouts that remain in the moving unit 200 after forming the spring support plates 209, so that predetermined ends of the return springs 300 can be held by the respective spring support plates 209.

Figure 9:
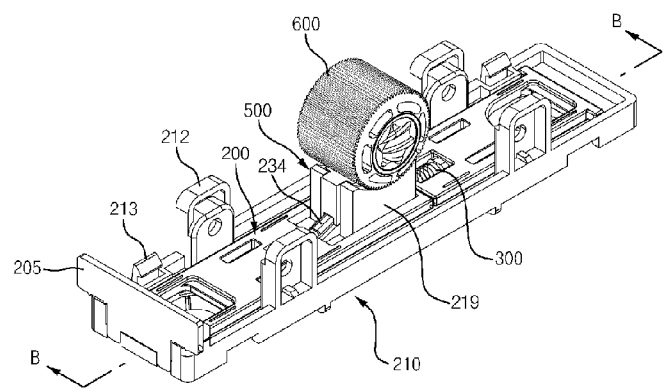
FIG. 9 is a perspective view illustrating an assembly including a block of the headrest moving device according to the preferred embodiment of the present invention.

The frame 210 is installed on the stay rod 400 and is placed below the moving unit 200 as shown in FIG. 9 so that the frame 210 can support the moving unit 200 and can guide the movement of the moving unit 200.

Figure 5:
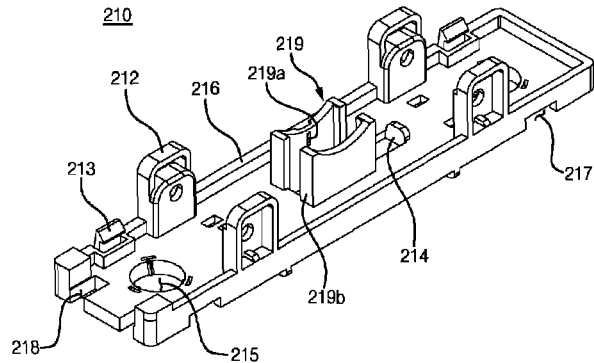
FIG. 5 is a perspective view illustrating a frame of the headrest moving device according to the preferred embodiment of the present invention.

As shown in FIG. 5, a locking guide part 219 is formed in the center of the frame 210.

In the locking guide part 219, support plates are provided in such a way that the support plates are spaced apart from each other at a predetermined interval and can support the front and rear parts of the locking unit 500 and guide the movement of the locking unit 500.

In opposite ends of each of the support plates, stop flanges 219b are formed by being bent forward or backward.

A space is defined between the stop flanges 219b of the opposite support plates so as to allow the main protrusion 234 to move in the space.

Further, in the support plate that is placed in the front, a longitudinal hole 219a is formed in a vertical direction.

Further, a spring support protrusion 219c is formed between the support plates that are placed in the front and in the back of the frame 210.

Accordingly, due to the frame 210, the moving unit 200 can move more stably and efficiently to the left and right.

The frame 210 is configured as a plate-shaped frame, with a guide rim 216 formed along the front, rear and a first side edge of the frame 210.

Further, a guide slit 218 is formed in a predetermined end of the frame 210 so as to receive a guide protrusion of the moving unit 200 therein.

Further, locking bosses 212 are formed in opposite ends of each of the front and rear edges of the frame 210 so that the frame 210 can be locked to another element using locking means, such as locking bolts. The locking bosses 212 are stepped in the upper portions thereof so as to increase their structural durability.

Further, support protrusions are formed in the front and rear corners of the end of the frame 210 so as to support opposite ends of the contact part 205.

Further, locking hooks 213 are formed in the frame 210 by protruding upward from opposite ends of the front edge of the frame 210. Further, locking steps 217 are formed in opposite ends of the rear edge of the frame 210 so as to be engaged with locking hooks of another element.

In the frame 210, through openings 215 are formed in opposite ends of the frame 210 in such a way that the openings 215 communicate with the respective stay rod through holes 202.

A contact protrusion is formed vertically on the inner circumferential surface of each through opening 215 of the frame 210 so that the contact protrusion can come into contact with the outer circumferential surface of the stay rod 400. Here, the contact protrusion formed in each through opening 215 may comprise three contact protrusions.

Further, holes are formed vertically through the frame 210 at locations near the respective contact protrusions.

Further, the frame 210 is also provided with through holes that communicate with the respective holes 206 of the moving unit 200.

Further, in the central portion of the frame 210, a spring support plate 214 is formed so as to support an end of the return spring 300.

A spring seat in which the return spring 300 is installed is formed in the frame 210 at a predetermined location, with the spring support plate 214 formed in the spring seat of the frame 210.

As shown in FIG. 3, the front and rear ends of the screw 700 are configured as polygonal ends 701 that have respective polygonal outer circumferences.

In the inner surfaces of the front and rear covers 110 and 120, polygonal holes are formed so as to receive the opposite polygonal ends 701 of the screw 700 therein. Here, the polygonal holes communicate with the respective locking holes 102.

Further, locking holes are formed in the front and rear ends of the screw 700 such that the locking holes of the screw 700 communicate with the respective locking holes 102 of the cover 100.

Accordingly, the screw 700 can be fastened to the cover 100.

Further, a circular disc-shaped press plate 702 is provided on the rear end of the screw 700. Here, the press plate 702 is placed between the rear polygonal end 701 and a threaded part 703 of the screw 700.

When installing the screw 700, an anti-release disc 140 is installed at a predetermined location between the press plate 702 and the rear cover 120.

The anti-release disc 140 has a circular disc-shaped structure, the diameter of which is greater than the diameter of the press plate 702 of the screw 700, with a polygonal through hole formed through the center of the anti-release disc 140 such that the rear polygonal end 701 can be inserted into the polygonal through hole of the anti-release disc 140. Further, a bent flange 141 is formed around the outer circumferential edge of the anti-release disc 140, in which the bent flange 141 is bent backward. Because the elastically deformable bent flange 141 is formed in the anti-release disc 140 as described above, the anti-release disc 140 can prevent a locking bolt that locks the screw 700 from being undesirably released after the screw 700 is fastened.

A front bracket 130 is placed between the threaded part 703 and the front cover 110.

The front bracket 130 is provided in the center thereof with a polygonal through hole through which the front polygonal end 701 of the screw 700 passes. Further, locking holes are formed through opposite ends of each of upper and lower edges of the front bracket 130 and so the front bracket 130 can be locked to the front cover 110.

Due to an interposition of the front bracket 130, the contact surface between the screw 700 and the front cover 110 increases and this can realize a reliable fastening of the screw 700 to the front cover 110.

Accordingly, in response to a forward/backward movement of the screw 700, the front cover 110 and the rear cover 120 can be moved simultaneously in the same direction.

As shown in FIG. 3, the block 600 is provided with threads on the inner circumferential surface thereof so that the screw 700 can be engaged with the block 600 by a screw type engagement.

The block 600 has a cylindrical shape, in which a through hole is formed through the center of the block 600 so that the screw 700 can pass through the through hole of the block 600, with the threads formed on the inner circumferential surface of the through hole.

Teeth are formed around the outer circumferential surface of the block 600.

The block 600 is rotatably installed on the frame 210, in which the block 600 is inserted into a guide unit 900 that will be described later here so that the block 600 cannot move forward or backward, but the forward and backward directional position of the block 600 is fixed.

Here, either one of the screw 700 and the block 600 is rotated.

Although the device according to the embodiment is configured such that the block 600 can be rotated as described above, it should be understood that the device may be configured such that the screw 700 instead of the block 600 can rotate.

Figure 6:
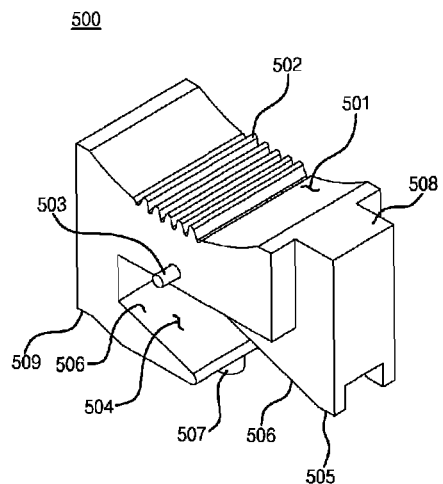
FIG. 6 is a perspective view illustrating a locking unit of the headrest moving device according to the preferred embodiment of the present invention.

As shown in FIG. 6, in response to a movement of the moving unit 200, the locking unit 500 can lock the block 600 or can release the block 600 from a locked state.

The locking unit 500 is provided with a block seat 501 for seating the block 600 therein.

The block seat 501 is formed in the upper surface of the locking unit 500.

Further, teeth 502 are formed in the locking unit 500 such that the teeth 502 are arranged in the block seat 501. Accordingly, when the block 600 comes into close contact with the locking unit 500, the block 600 is engaged with the locking unit 500 by the teeth of them.

A guide rail 508 is formed vertically in the first end of the locking unit 500 so as to guide a vertical movement of the locking unit 500.

To allow the locking unit 500 to move vertically in response to a horizontal movement of the moving unit 200, the locking unit 500 is provided with an insert opening 504 into which the main protrusion 234 of the moving unit 200 is inserted.

As described above, the headrest moving device of this invention can efficiently lock the block 600 and can efficiently release the block 600 from the locked state using a simple construction comprising the moving unit 200 and the locking unit 500.

The insert opening 504 is formed in a lower portion of a predetermined part of the locking unit 500 such that the insert opening 504 is open to the left and right.

In the locking unit 500, a flat surface part 505 and an inclined surface part 506 are formed in such a way that the two surface parts 505 and 506 are placed at respective locations in the upper part inside the insert opening 504. Further, a second inclined surface part 506 is formed in the locking unit 500 in such a way that the second inclined surface part 506 is placed in a lower part inside the insert opening 504.

In a lower portion of the second end of the locking unit 500, a flat surface part 509 is formed and is supported by the sub-protrusion 233 of the moving unit 200.

A guide protrusion 503 is formed in the front surface of the locking unit 500 so that the guide protrusion 503 can be inserted into the longitudinal hole 219a of the frame 210. Due to the guide protrusion 503, the locking unit 500 can move more efficiently upward or downward.

Further, a spring support protrusion 507 protrudes downward from the lower surface of the locking unit 500.

Here, a locking support spring 510 may be installed in such a way that the upper and lower ends of the locking support spring 510 are fitted over the spring support protrusion 507 of the locking unit 500 and over the spring support protrusion 219c of the frame 210. In other words, the locking support spring 510 is placed between the bottom of the locking unit 500 and the top of the frame 210.

Due to the locking support spring 510, when the locking unit 500 is in a locked state, the locking unit 500 can be brought more efficiently into close contact with the block 600, and when the locking unit 500 is returned from a released state to the locked state, the locking unit 500 can be returned more efficiently to the locked state.

In the stay rod 400, at least two hook slits 411 are formed vertically such that the moving unit 200 can be caught by hook slits 411.

The stay rod 400 includes a moving unit 420 and vertical rod members 410 that are connected to the opposite ends of the moving unit 420.

Each of the vertical rod members 410 is provided with at least two hook slits 411 on the outer circumferential surface thereof at predetermined locations.

The headrest moving device of this invention further includes a guide unit 900 which comprises a first guide part 940 that guides the movement of the screw 700 and second guide parts 910 that guide the movement of the vertical rod members 410 of the stay rod 400.

Figure 7:
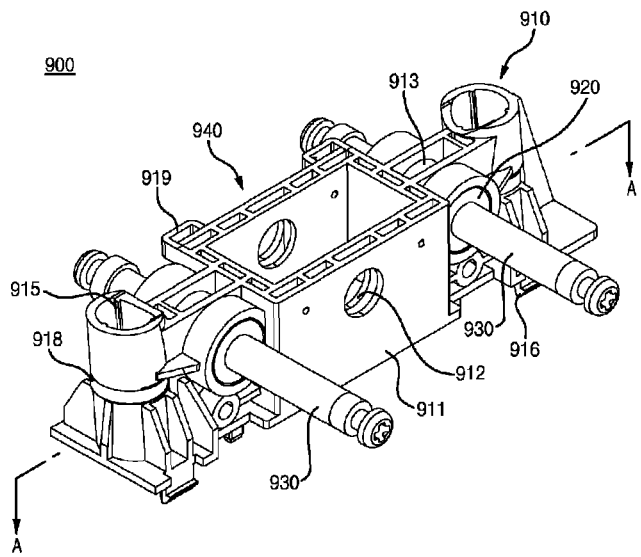
FIG. 7 is a perspective view illustrating a guide unit of the headrest moving device according to the preferred embodiment of the present invention.

As shown in FIG. 7, the second guide parts 910 are formed in opposite ends of the guide unit 900 and the first guide part 940 is formed at a location between the two second guide parts 910.

The first guide part 940 includes a housing part 911 that surrounds the block 600 and forward/backward movement guide parts that are placed in opposite ends of the housing part 911 so as to guide the forward/backward movement of both the screw 700 and the cover 100.

The housing part 911 comprises a sidewall that surrounds the front, back and opposite sides of the block 600, and a bottom. A guide part through opening is formed through the bottom so that the locking guide part 219 of the frame 210 passes through the guide part through opening.

The sidewall of the housing part 911 is provided with block through holes 912 through which the screw 700 passes.

Further, anti-collision protrusions 919 are formed in opposite ends of the upper and lower parts of a front section of the sidewall of the housing part 911.

Due to the anti-collision protrusions 919, even when a user moves the headrest excessively and the housing part 911 collides against the front bracket 130, impact can be reduced and so the present invention can reduce noise and can prevent damage to the elements.

Each of the forward/backward movement guide parts comprises a bearing 920 that is provided so as to realize an efficient movement of the screw 700 in forward and backward directions and a bracket 913 in which the bearing 920 is installed.

Each guide rod 930 that is connected to the front cover 110 and to the rear cover 120 at front and rear ends thereof is inserted into an associated bearing 920 so that the screw 700 can be efficiently moved forward or backward.

Figure 18:
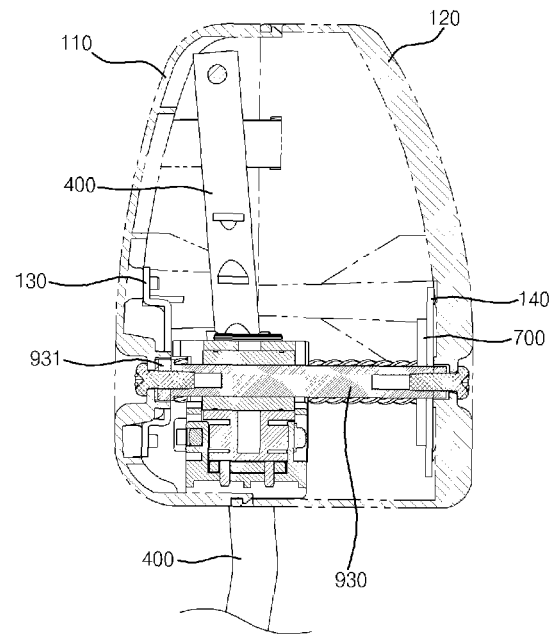
FIG. 18 is a sectional view illustrating the preferred embodiment of the present invention taken along line D-D of FIG. 14.
Figure 19:
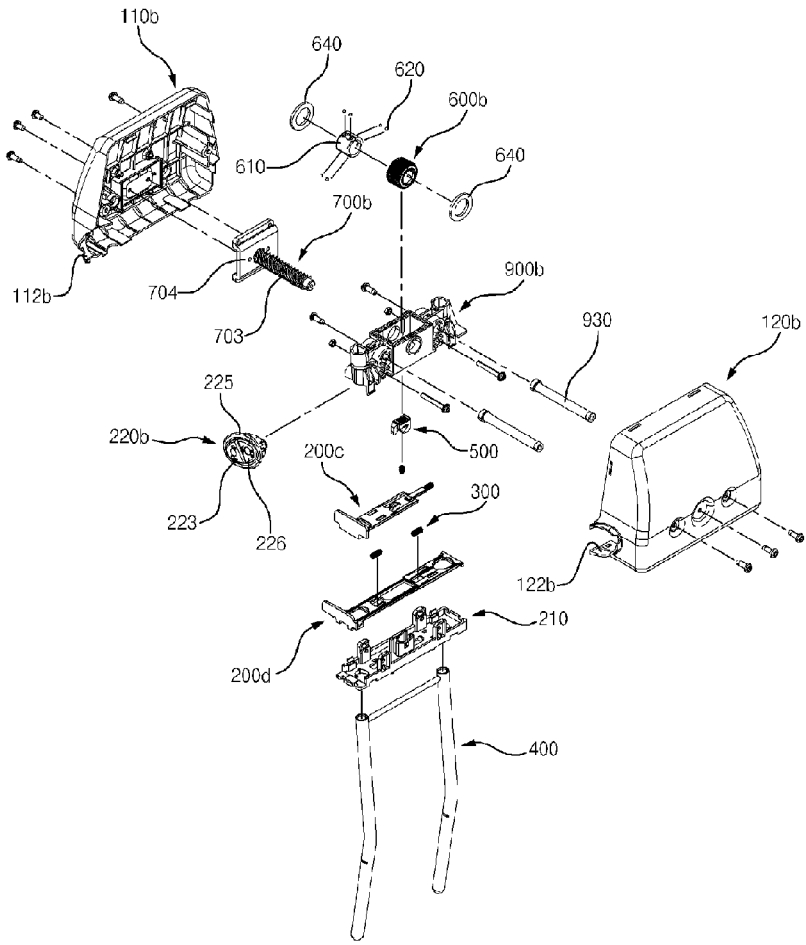
FIG. 19 is an exploded perspective view illustrating a headrest moving device according to a second embodiment of the present invention
Figure 20:
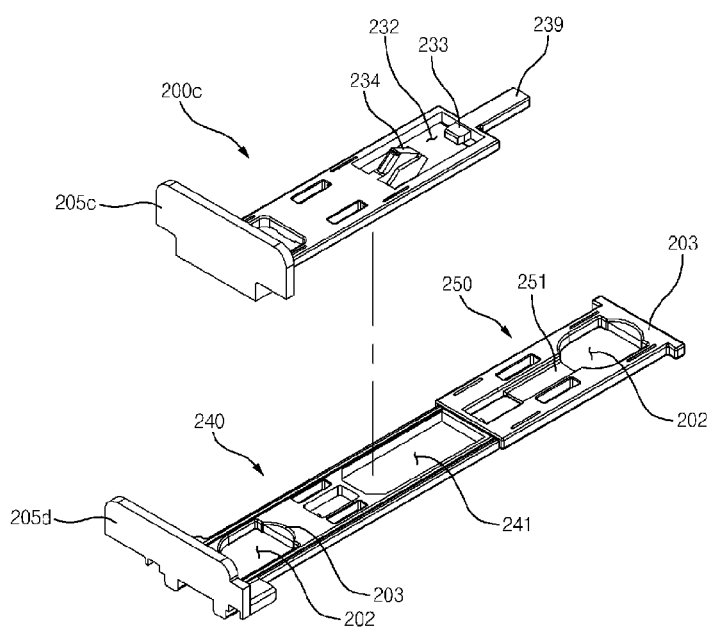
FIG. 20 is an enlarged view illustrating a moving unit of the headrest moving device of FIG. 19.
Figure 21:
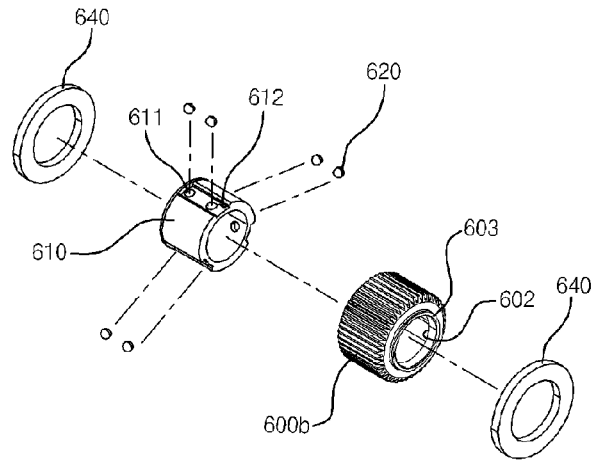
FIG. 21 is an enlarged view illustrating a block of the headrest moving device of FIG. 19.
Figure 22:
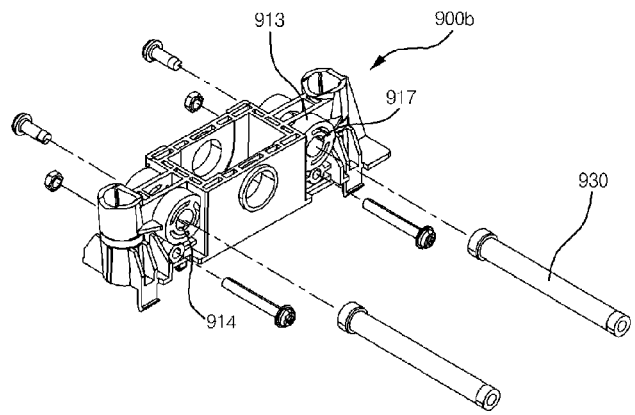
FIG. 22 is an enlarged view illustrating a guide unit of the headrest moving device of FIG. 19.
Figure 23:
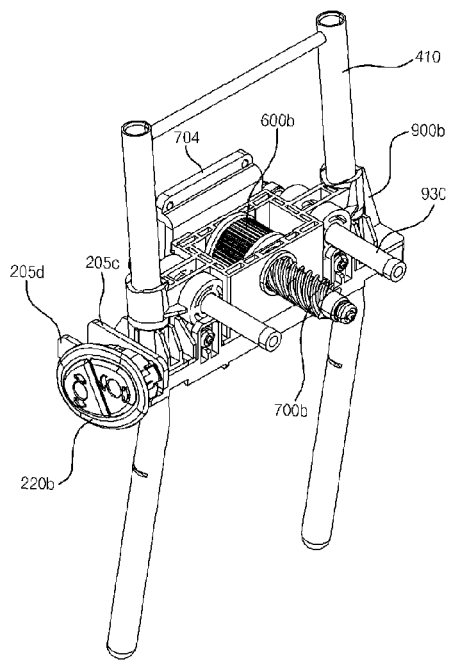
FIG. 23 is a perspective view illustrating an assembly of the headrest moving device of FIG. 19 from which a cover is removed.
Figure 24:
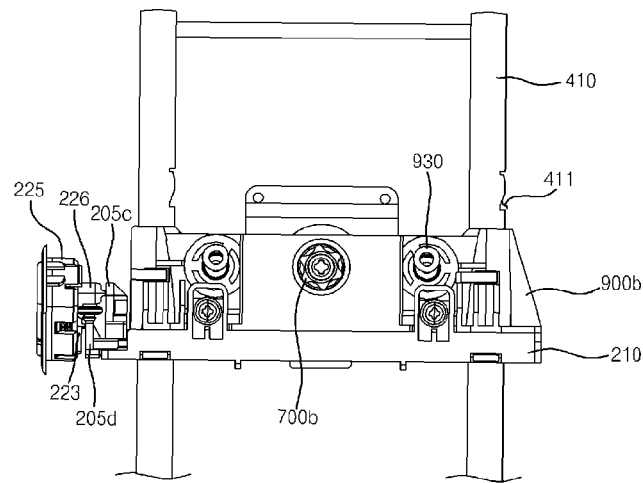
FIG. 24 is a bottom plan view of FIG. 23
Figure 25:
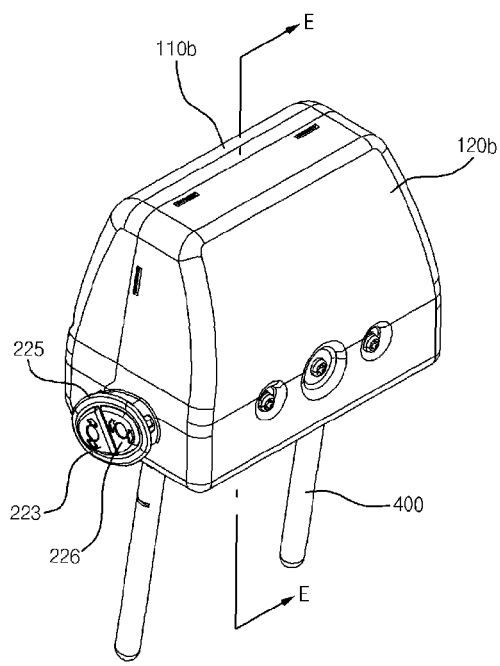
FIG. 25 is a perspective view illustrating an assembled state of the headrest moving device of FIG. 19

Further, as shown in FIG. 18, an elastic member 931 is placed in each of the front and rear ends of the guide rod 930.

The elastic members 931 are configured as ring-shaped members and are installed in the front and rear ends of the guide rod 930.

The elastic members 931 are seated in the respective seats 103 that are formed in the front and rear covers 110 and 120. The elastic members 931 are installed at respective locations between bolts that lock the guide rod 930 and the front and rear ends of the guide rod 930.

Due to the elastic members 931, a dimensional error that may be generated during a production process can be efficiently absorbed by the elastic members 931 during an assembly process.

Each of the second guide parts 910 are configured as cylindrical parts that are placed vertically.

In the embodiment of the present invention, the second guide parts 910 may be configured to be bent forward according to the shapes of the vertical rod members 410 of the stay rod 400. In the embodiment in which the stay rod 400 is bent forward as described above, when the headrest is moved upward, the headrest can also be automatically moved forward.

Due to the guide unit 900, the headrest can be more efficiently moved forward, backward, upward and downward.

Three contact protrusions 915 are formed vertically on the inner circumferential surface of each of the second guide parts 910 so as to allow the stay rod 400 to perform an efficient vertical movement. Due to the contact protrusions 915, when the stay rod 400 moves upward or downward, the stay rod 400 can move stably and efficiently while minimizing the noise and friction.

Figure 8:
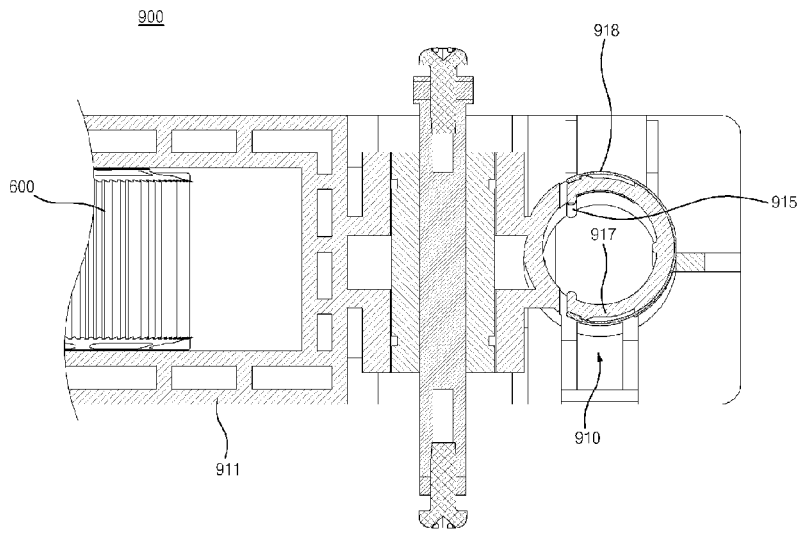
FIG. 8 is a sectional view illustrating the guide unit according to the preferred embodiment of the present invention taken along line A-A of FIG. 7.

Further, as shown in FIG. 8, each of the second guide parts 910 is provided with a slit so that an elastic support part 917 is formed in each of the second guide parts 910. Accordingly, the outer circumferential surface of each of the vertical rod members 410 of the stay rod 400 can be elastically supported by the elastic support part 917.

Preferably, the elastic support part 917 is configured such that the contact protrusions 915 are placed in opposite ends of the elastic support part 917.

The elastic support part 917 comprises two elastic support parts that are placed at locations around the vertical rod members 410.

Further, a snap ring 918 is fitted over the second guide part 910 so as to surround and support the elastic support part 917 from the outside.

To allow an efficient installation of the snap ring 918 on the elastic support part 917, the outer circumferential surface of the elastic support part 917 is provided with a stop flange, and the snap ring 918 is provided with a hook that is caught by the stop flange.

Due to the elastic support part 917 and the snap ring 918, the second guide parts 910 can elastically support the stay rod 400 in a state in which the second guide parts 910 can prevent a clearance from being generated between the second guide parts 910 and the snap ring 918. Further, the snap ring 918 can structurally reinforce the elastic support part 917.

Further, in opposite ends of the front side of the guide unit 900, stop flanges are formed so as to be engaged with the locking hooks 213 of the frame 210. In opposite ends of the rear side of the guide unit 900, locking hooks 916 are formed so as to be engaged with the locking steps 217 of the frame 210. Further, bolt locking holes are formed in the guide unit 900 so as to be fastened to the locking bosses 212 of the frame 210 using bolts.

The guide unit 900 that has the stop flanges and the locking hooks 916 is placed above both the frame 210 and the moving unit 200 and is fastened to the frame 210. Accordingly, the frame 210, the moving unit 200 and the guide unit 900 are sequentially arranged from the lower to the upper part in the headrest moving device.

Hereinbelow, the operation of the embodiment having the above-mentioned construction will be described.

When the headrest is in a fixed state, the operation of the headrest moving device is as follows.

As shown in FIG. 15, when the headrest moving device is assembled in such a way that the vertical rod members 410 of the stay rod 400 sequentially pass through the second guide parts 910, through the stay rod through holes 202 and through the through openings 215, the locking parts 203 of the moving unit 200 are engaged with the hook slits 411 of the stay rod 400. Therefore, the stay rod 400 in the above state is in a fixed vertical position without being move upward or downward.

Here, the steel plates 207 are formed in the locking parts 203 through an insert molding process so that the locking parts 203 can be efficiently supported even when the weight and impact are applied from the headrest to the locking parts 203. Further, the steel plates 207 are not exposed to the outside, and the stay rod 400 does not come into frictional contact with the steel plates 207, and so noise is not generated therefrom.

Further, the moving unit 200 in the above state is in a fixed position without being moved to the left or right by the elastic force of the return spring 300. Therefore, the flat surface 235 of the main protrusion 234 comes into contact with the flat surface part 505 of the locking unit 500, and the flat surface part 509 of the locking unit 500 comes into contact with the sub-protrusion 233, thereby being supported thereby, in a state in which the main protrusion 234 of the moving unit 200 is inserted in the insert opening of the locking unit 500.

Accordingly, the teeth 502 of the locking unit 500 are engaged with the teeth of the block 600, and so the block 600 is in a fixed position without being rotated.

When the block 600 is in the fixed position, the screw 700 that is engaged with the block 600 through a screw type engagement is maintained in a fixed position so that the vertical position and the forward/rearward position of the headrest are fixed.

When a user wants to adjust the position of the headrest, the user manipulates the headrest moving device as follows.

As shown in FIG. 16, when the user presses the press member 220 with a force greater than the elastic force of the return spring 300, the pressing force is transmitted to the moving unit 200*by* the pressing force transfer member 224.

Therefore, the moving unit 200 is moved to the left and, at the same time, both the main protrusion 234 and the sub-protrusion 233 are moved to the left.

Accordingly, the inclined surface 237 of the main protrusion 234 comes into contact with the inclined surface part 506 of the locking unit 500 and this allows the locking unit 500 to be moved downward so that the tooth engagement of the locking unit 500 with the block 600 is released. In other words, the block 600 is released from the locked state.

Accordingly, the block 600 is brought into a rotatable state.

That is, the block 600 is rotatable relative to the screw 700 and so, when the user moves the headrest forward or backward, the block 600 is rotated relative to the screw 700 and both the screw 700 and the cover 100 are moved forward or backward.

Further, when the moving unit 200 is moved to the left, the locking parts 203 are released from the hook slits 411 of the stay rod 400. Accordingly, the headrest can be moved upward or downward.

As described above, the user can easily adjust the position of the headrest forward, backward, upward or downward while pressing the press member 220.

When the user releases the pressing force from the press member 220, the position of the headrest is fixed.

As described above, the present invention is advantageous in that it can minimize the size of the headrest moving device and can easily move the headrest forward, backward, upward or downward using one press member 220.

Further, the present invention is advantageous in that it uses the press member instead of a conventional wire-operated mechanism, thereby preventing an occurrence of a difference between operations and simplifying the construction, and reducing the production cost.

Further, the present invention having the above-mentioned simple construction can efficiently and steplessly control the forward and backward position of the headrest.

Hereinbelow, a headrest moving device according to a second embodiment of the present invention will be described. In the following description, the description of those elements common to both the primary embodiment and the second embodiment will be omitted.

The headrest moving device of this embodiment includes a press member 220b, a moving unit that is moved horizontally by the press member 220b, a return spring 300 that returns the moving unit, a screw 700b, a block 600b that has a through hole through which the screw 700b passes, a locking unit 500 that releases the block 600b in response to a movement of the moving unit, and a frame 210 that is installed on a stay rod 400 and supports the moving unit, wherein either one of the screw 700b and the block 600b is rotated and balls 620 are placed between the screw 700b and the block 600b.

Unlike the primary embodiment, this second embodiment may be configured such that the press member 220b and the moving unit comprise two members and two units respectively when necessary, as will be described hereinbelow, in an effort to improve operational immediacy and to realize easy manipulation.

The press member 220b comprises a first press member 223 and a second press member 226.

Further, the press member 220b includes a casing member 225 that surrounds both the first press member 223 and the second press member 226, thereby realizing easy assembly.

The first press member 223 and the second press member 226 are installed in the casing member 225 in such a way that the two press members 223 and 226 can slide in a pressed direction. The casing member 225 is provided with hooks and is installed in the cover that comprises a front cover 110a and a rear cover 120b.

In the front and rear cover 110a and 120b, respective press member guides 112b and 122b that guide the press member 220b are formed.

The press member guides 112b and 122b that are formed in the front cover 110a and the rear cover 120b, respectively, are combined with each other by an engagement of hooks and holes. Here, the hooks are inserted into the holes.

Respective finger seats are formed on the external surfaces of the first press member 223 and the second press member 226 so that a user can easily manipulate the press members 223 and 226 with fingers placed in the finger seats. Further, arrow marks are formed on the external surfaces of the first press member 223 and the second press member 226 through depressed engraving or embossed engraving at predetermined locations above, below, in the front of and in the back of the finger seats. Due to the arrow marks, the user can easily manipulate the first press member 223 and the second press member 226 by touch using a finger without viewing the press member 220b so as to move the headrest upward, downward, forward or backward.

The moving unit a first moving unit 200d that is moved by the first press member 223 and a second moving unit 200c that is moved by the second press member 226.

The first moving unit 200d is placed on the frame 210 and comprises a left-sided first moving unit 250 and a right-sided first moving unit 240.

The left-sided first moving unit 250 and the right-sided first moving unit 240 are configured as plate-shaped units and are placed on the frame 210 at left and right sides.

The left-sided first moving unit 250 and the right-sided first moving unit 240 are provided with respective stay rod through holes 202 and respective locking parts 203 placed at sides of the respective stay rod through holes 202.

The locking parts 203 of the first moving unit 200d are caught by the at least two hook slits 411 that are formed vertically on the stay rod 400.

A horizontal movement guide slit 251 is formed horizontally on the upper surface of the left-sided first moving unit 250.

A contact part 205d that transmits the pressing force acting on the first press member 223 is provided in an end of the right-sided first moving unit 240 by bending the end.

An opening 241 is formed through the right-sided first moving unit 240 so that the locking unit 500 can pass through the opening 241 without interfering with the right-sided first moving unit 240 when the locking unit 500 moves upward or downward.

The second moving unit 200c is configured as a plate-shaped unit and is placed on the right-sided first moving unit 240.

The second moving unit 200c is provided with a main protrusion 234 that has both a flat surface and an inclined surface.

The main protrusion 234 is formed in such a way that it is placed at a predetermined position inside a through opening 232 that is formed in the second moving unit 200c.

Further, the second moving unit 200c is provided with a sub-protrusion 233 in such a way that the sub-protrusion 233 is placed at another predetermined position inside the through opening 232.

Accordingly, the locking unit 500 can release the block 600b from a locked state in response to a movement of the second moving unit 200c.

The second moving unit 200c is provided with stay rod through holes. Further, a contact part 205c that can transmit the pressing force acting on the second press member 226 is formed in a first end of the second moving unit 200c by bending the end.

Further, a horizontal movement guide protrusion 239 extends from a second end of the second moving unit 200c. The horizontal movement guide protrusion 239 is inserted into the horizontal movement guide slit 251 and is guided thereby. Further, a return spring 300 that is seated in the horizontal movement guide slit 251 is fitted over the end of the horizontal movement guide protrusion 239 so that the second moving unit 200c can be returned.

A threaded part 703 is formed on the outer circumferential surface of the screw 700b, and a front bracket 704 that fastens the screw 700b to the front cover 110b is integrally formed in the front end of the screw 700b.

Here, the screw 700b and the front bracket 704 are integrally formed as a single body as described above, and so this embodiment is advantageous in that it reduces the number of elements and improves assembly efficiency of the elements.

The block 600b is provided with a through hole 601 through which the screw 700b passes.

Further, teeth are formed on the outer circumferential surface of the block 600b so as to be engaged with teeth of the locking unit 500.

A stop flange 602 is formed on the inner circumferential surface of the block 600b by protruding. Here, the stop flange 602 is placed in the rear end of the block 600b.

Further, ring fitting flanges 603 are formed by protruding in the front and rear ends of the block 600b such that the ring fitting flanges 603 surround the opposite ends of the through hole 601 of the block 600b.

A ring 640 that has an outer diameter greater than that of the block 600b is fitted over each of the ring fitting flanges 603.

The balls 620 are placed between the screw 700b and the block 600b.

In other words, the balls 620 are interposed between the outer circumferential surface of the screw 700b and the inner circumferential surface of the block 600b.

The balls 620 are seated in a ring-shaped ball stay 610 and the ball stay 610 is placed inside the through hole 601 of the block 600b.

In the ball stay 610, ball seat holes 611 that seat the respective balls 620 therein are formed in the front and rear ends of the ball stay 610. In this embodiment, several ball seat holes 611 are arranged around the outer circumferential surface of the ball stay 610.

Further, ball guide grooves 612 are axially formed on the outer circumferential surface of the ball stay 610 such that the ball guide grooves 612 communicate with the ball seat holes 611 in which the balls 620 are seated. The ball guide grooves 612 provide an advantage in that, when the balls 620 are installed in the ball stay 610, the ball guide grooves 612 can automatically determine the positions of the balls 620, thereby realizing easy assembly.

Further, in order to prevent the balls 620 from undesirably dropping into the ball stay 610 through the ball seat holes 611 when installing the balls 620 in the ball stay 610, a support ring (not shown) may be inserted in the ball stay 610 until the screw 700b is inserted into the ball stay 610, thereby realizing easy assembly. The support ring is removed from the ball stay 610 by the inserting of the screw 700b into the ball stay 610.

The ball stay 610 in which the balls 620 are seated is installed in the through hole 601 of the block 600b.

In the above state, the screw 700b passes through the ball stay 610.

Further, when the ball stay 610 is inserted into the block 600b, the ball stay 610 is stopped by the stop flange 602, thereby realizing easy assembly of the ball stay 610 in the block 600b.

Further, this second embodiment is provided with a guide unit 900b that has a forward/backward movement guide part. The forward/backward movement guide part comprises guide rods 930 that are connected to the front cover 110 and to the rear cover 120 at the front and rear ends thereof. The forward/backward movement guide part also comprises brackets 913 that have insert holes 914 into which the guide rods 930 are inserted.

In each of the brackets 913, an axial rib 917 is formed in the insert hole 914. The axial rib 917 comprises a plurality of ribs that are arranged on the inner circumferential surface of each insert hole 914. The ribs 917 may be configured to have a semicircular cross-section.

The ribs 917 come into contact with the outer circumferential surfaces of the guide rods 930, thereby minimizing the frictional force that is generated between the guide rod 930 and the bracket 913. Further, the ribs 917 can more efficiently guide the forward or backward movement of the guide rods 930 inside the bracket 913.

The forward/backward movement guide part is placed in each of opposite ends of the guide unit 900b so that the forward/backward movement guide part can be placed around each end of the screw 700b.

The guide rods 930 of the forward/backward movement guide part can prevent the guide unit 900b from undesirably moving to left and right and from being undesirably rotated.

Unlike the above-mentioned embodiment, the screw 700b and the block 600b (comprising a construction that moves the position of the headrest forward or backward) may be configured to form two sets instead of using the guide rods 930, in which the two sets of the screw 700b and the block 600b are placed in the left and right sides of the device so as to perform the function of the guide rods 930.

Hereinbelow, the operation of the second embodiment will be described.

When the headrest is in a fixed position, the operation of the headrest moving device is as follows.

Figure 26:
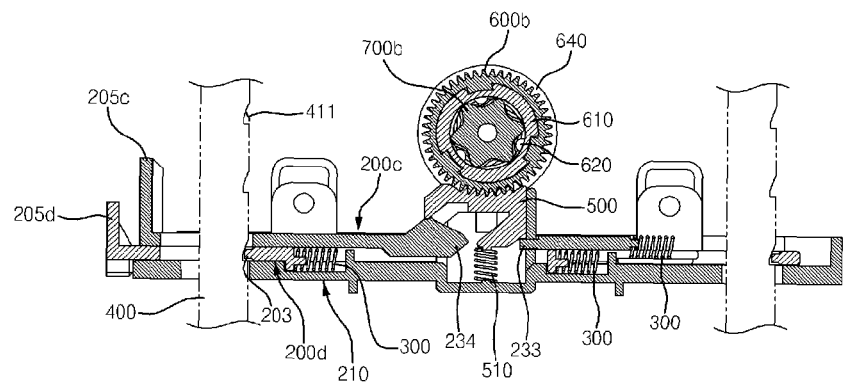
FIG. 26 is a sectional view illustrating the headrest moving device according to the second embodiment of the present invention when the position of a headrest is fixed.

As shown in FIG. 26, in a state in which the vertical rod members 410 of the stay rod 400 is installed such that it passes through the stay rod through holes 202, the locking parts 203 of both the left-sided first moving unit 250 and the right-sided first moving unit 240 are engaged with the hook slits 411 of the stay rod 400, and the stay rod 400 cannot move upward or downward, but is maintained in a fixed vertical position due to the engagement between the locking parts 203 and the hook slits 411.

Further, the flat surface of the main protrusion 234 comes into contact with the flat surface part of the locking unit 500, and the flat surface part that is placed in the second end of the locking unit 500 comes into contact with the sub-protrusion 233, thereby being supported by the sub-protrusion 233, in a state in which the main protrusion 234 of the second moving unit 200c is inserted into the insert opening of the locking unit 500.

Accordingly, the teeth 502 of the locking unit 500 are engaged with the teeth of the block 600b, and so the block 600b cannot be rotated, but is in a fixed position.

Because the block 600b is in the fixed position as described above, the screw 700b that is assembled with the block 600b is maintained in a fixed state, and so the forward/backward position of the headrest is fixed.

When a user wants to adjust the position of the headrest, the user manipulates the headrest moving device and the headrest moving device will be operated as follows.

When adjusting the vertical position of the headrest, the headrest moving device will be operated as follows.

Figure 27:
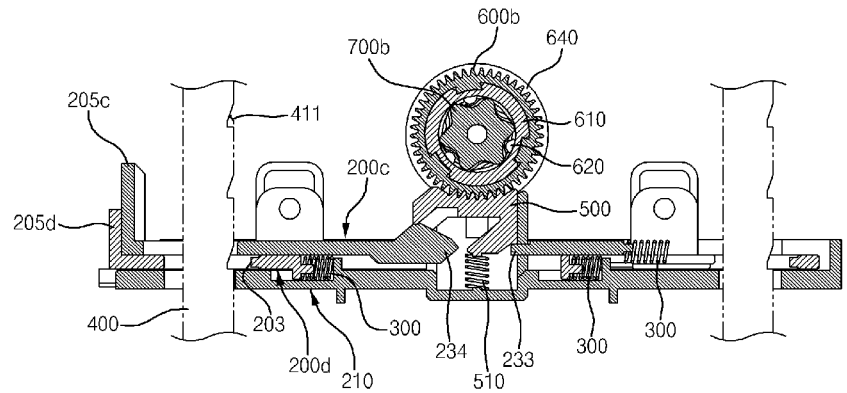
FIG. 27 is a sectional view illustrating the headrest moving device according to the second embodiment of the present invention when the position of the headrest is controlled upward and downward.

As shown in FIG. 27, when the user presses the first press member 223 with a pressing force greater than the elastic force of the return spring 300, the pressing force is transmitted to the first moving unit 200d.

When the first moving unit 200d is moved to the left, the locking parts 203 are removed from the hook slits 411 of the stay rod 400. Accordingly, the headrest can be moved upward or downward.

In the above state, the user can easily adjust the vertical position of the headrest upward or downward in a state in which the user presses the first press member 223 as described above.

When the user removes the pressing force from the first press member 223, the position of the headrest is fixed as described above.

When the user adjusts the vertical position of the headrest, the headrest moving device will be operated as follows.

Figure 28:
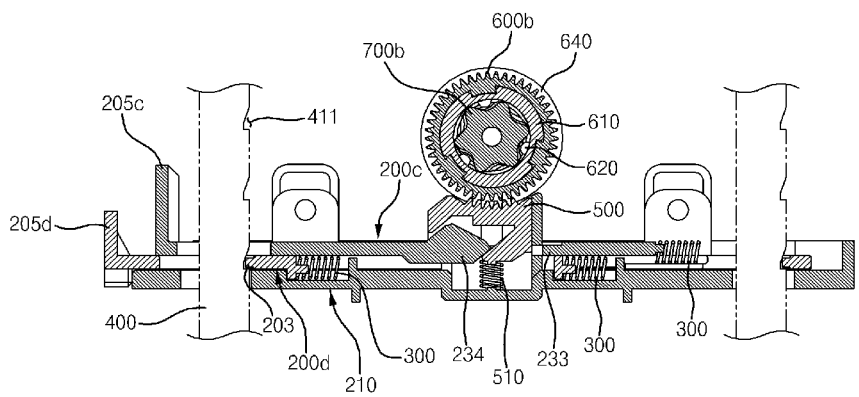
FIG. 28 is a sectional view illustrating the headrest moving device according to the second embodiment of the present invention when the position of the headrest is controlled forward and backward.
Figure 29:
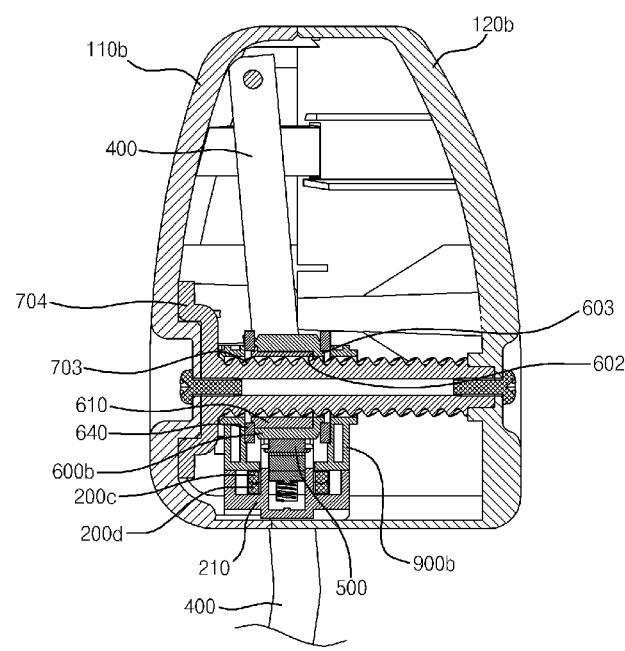
FIG. 29 is a sectional view taken along line E-E of FIG. 25.

As shown in FIG. 28, when the user presses the second press member 226 with a pressing force greater than the elastic force of the return spring 300, the pressing force is transmitted to the second moving unit 200c.

Therefore, the second moving unit 200c is moved to the left and, at the same time, both the main protrusion 234 and the sub-protrusion 233 are moved to the left.

Accordingly, the inclined surface of the main protrusion 234 comes into contact with the inclined surface part of the locking unit 500 and this allows the locking unit 500 to move downward. The teeth of the locking unit 500 are released from the engagement with the teeth of the block 600b. In other words, the block 600b is released from the locked state.

The block 600b in the above state is rotatably supported.

In other words, the block 600b can be rotated relative to the screw 700b and so, when the user moves the headrest forward or backward, the block 600b is rotated relative to the screw 700b and both the screw 700b and the cover 100b are moved forward or backward.

As described above, the user can easily and efficiently adjust the position of the headrest back and forth in a state in which the user presses the second press member 226.

When the user removes the pressing force from the second press member 226, the headrest is returned to the fixed position as described above.

In the headrest moving device according to this embodiment, the ball 620 is placed between the block 600b and the screw 700b and so a relative rotation between the block 600b and the screw 700b can be efficiently performed, thereby realizing improved operational performance of the headrest moving device.

Further, the present invention can separately control the forward, backward, upward and downward positions of the headrest using the two press members, thereby preventing an undesired positional adjustment of the headrest which is not intended by a user.

Although the embodiments of the present invention have been disclosed for illustrative purposes, those skilled in the art will appreciate that various modifications, additions and substitutions are possible, without departing from the scope and spirit of the invention as disclosed in the accompanying claims.

DESCRIPTION OF REFERENCE CHARACTERS OF IMPORTANT PARTS

100: cover,
110: front cover,
120: rear cover
130: front bracket,
140: anti-release disc
200: moving unit,
210: frame,
220: press member
400: stay rod,
500: locking unit,
600: block
700: screw,
900: guide unit

The invention claimed is:

1. A headrest moving device, comprising:
a press member;
a moving unit moved horizontally by the press member;
a return spring for returning the moving unit;
a screw;
a block having a through hole through which the screw passes;
a locking unit for releasing the block from a locked state in response to a movement of the moving unit;
a frame installed on a stay rod and supporting the moving unit, wherein
either one of the screw and the block is rotated, wherein threads are formed in the block so that the block can be engaged with the screw through a screw type engagement, or a ball is placed between the screw and the block; and
wherein teeth are formed around an outer circumferential surface of the block,
a block seat is formed in the locking unit so as to seat the block therein,
teeth are formed in the locking unit in such a way that the teeth of the locking unit are arranged in the block seat,
a main protrusion having both a flat surface and an inclined surface is formed in the moving unit, and
an insert opening is formed in the locking unit so as to receive the main protrusion therein so that, when the moving unit moves horizontally, the locking unit can move upward or downward.

2. The headrest moving device as set forth in claim 1, wherein the stay rod is provided with at least two hook slits that are formed vertically on the stay rod such that the hook slits can catch the moving unit.

3. The headrest moving device as set forth in claim 1, wherein
the press member includes a first press member and a second press member, the moving unit includes a first moving unit that is moved by the first press member and a second moving unit that is moved by the second press member,
the stay rod is provided with at least two hook slits that are formed vertically on the stay rod such that the hook slits can catch the first moving unit, and
the locking unit releases the block from the locked state in response to a movement of the second moving unit.

4. The headrest moving device as set forth in claim 1, wherein the stay rod is provided with at least two hook slits that are formed vertically on the stay rod such that the hook slits can catch the moving unit.

5. A headrest moving device, comprising:
a press member;
a moving unit moved horizontally by the press member;
a return spring for returning the moving unit;
a screw;
a block having a through hole through which the screw passes;
a locking unit for releasing the block from a locked state in response to a movement of the moving unit; and
a frame installed on a stay rod and supporting the moving unit, wherein
the stay rod is provided with at least two hook slits that are formed vertically on the stay rod such that the hook slits can catch the moving unit,
wherein either one of the screw and the block is rotated, wherein
threads are formed in the block so that the block can be engaged with the screw through a screw type engagement, or a ball is placed between the screw and the block.

6. A headrest moving device, comprising:
a press member;
a moving unit moved horizontally by the press member;
a return spring for returning the moving unit;
a screw;
a block having a through hole through which the screw passes;
a locking unit for releasing the block from a locked state in response to a movement of the moving unit; and
a frame installed on a stay rod and supporting the moving unit, wherein
either one of the screw and the block is rotated, wherein
threads are formed in the block so that the block can be engaged with the screw through a screw type engagement, or a ball is placed between the screw and the block, and
wherein the press member includes a first press member and a second press member, the moving unit includes a first moving unit that is moved by the first press member and a second moving unit that is moved by the second press member,
the stay rod is provided with at least two hook slits that are formed vertically on the stay rod such that the hook slits can catch the first moving unit, and
the locking unit releases the block from the locked state in response to a movement of the second moving unit.

\* \* \* \* \*